H. H. McINTIRE.
PLATEN.
APPLICATION FILED NOV. 12, 1917.
1,349,384.
Patented Aug. 10, 1920.
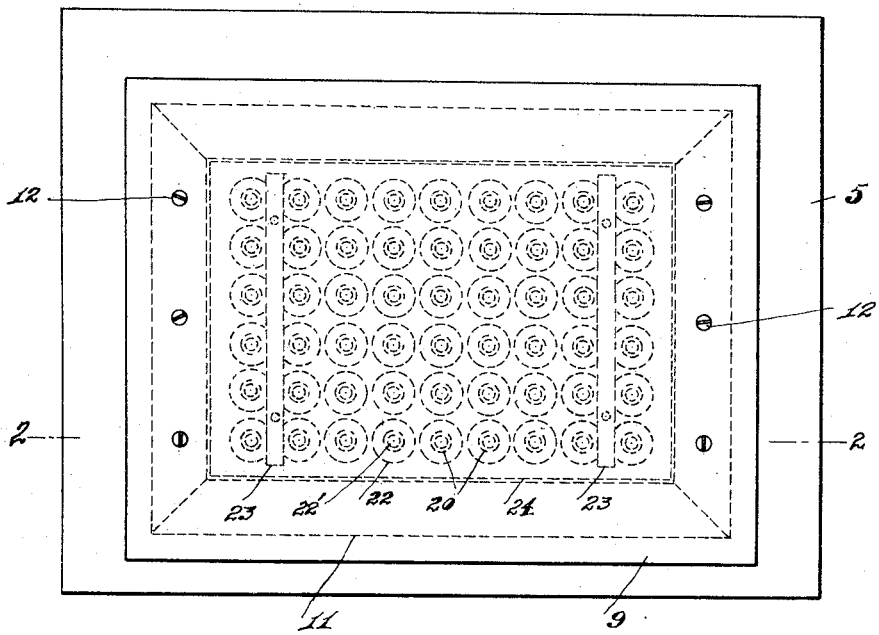
Fig. 1.
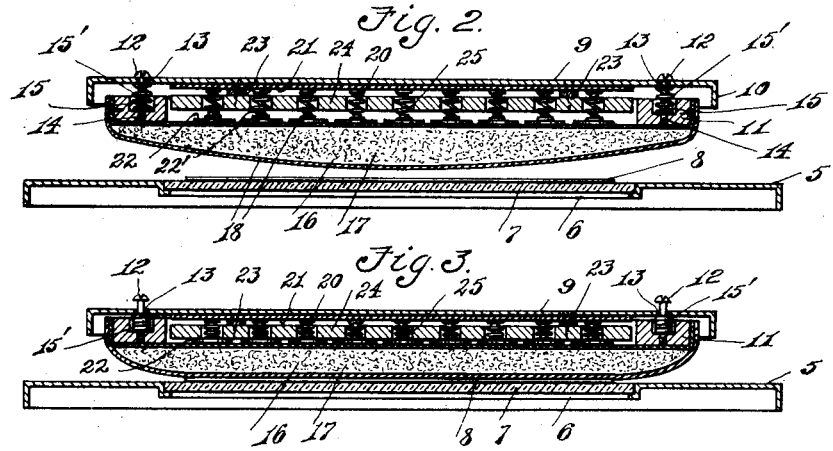
Fig. 2.
Fig. 3.
Hervey H. McIntire
INVENTOR.
By George J. Oltsch
ATTORNEY.

UNITED STATES PATENT OFFICE.

HERVEY H. McINTIRE, OF SOUTH BEND, INDIANA.

PLATEN.

1,349,384.  Specification of Letters Patent.  Patented Aug. 10, 1920.

Application filed November 12, 1917. Serial No. 201,465.

*To all whom it may concern:*

Be it known that I, HERVEY H. MCINTIRE, a citizen of the United States, residing at South Bend, in the county of St. Joseph and State of Indiana, have invented certain new and useful Improvements in Platens, of which the following is a specification.

The invention relates to improvements in platens, and is more specifically adapted for use in connection with a photographic printing machine, although same is applicable equally as well for use in any connection wherein it is necessary or desirable to use a platen adapted to give a uniform contact.

The object of the present invention is to provide a platen adapted to apply a yielding contact and pressure to the print or sensitized paper disposed upon the negative, and embodying a plurality of independently yielding means which permits the contact surface of the platen to conform with any variation in thickness or curvature of the glass negative plate, whereby a perfect contact between the print paper and the negative is obtained. A further object of the invention resides in the provision of a platen capable of yielding at specific areas of its contact surface, and which is yieldable as a whole, whereby the danger of breaking negatives due to excess pressure being applied is materially reduced and practically eliminated.

The invention in the preferred form of details will be described in the following specification, reference being had particularly to the accompanying drawings, in which:—

Figure 1 is a plan view of a platen embodying the invention, and shown disposed upon a table or face board of a photographic printing machine.

Fig. 2 is a vertical section of the same taken on line 2—2 of Fig. 1.

Fig. 3 is a similar view showing the position of the parts when the platen has been pressed into engagement with the print paper and negative preliminary to the exposure thereof to a source of light.

The reference numeral 5 designates the upper portion or top of a photographic printing machine, so much only of such a machine being shown as will make clear the application of the present invention to such types of machines, and which, as is well understood, are provided with a source of light arranged beneath the top, and which latter has an opening 6, for which the negative 7 forms a closure, and upon which negative the sensitized or print paper is disposed for exposure to the light through the negative. The numeral 8 designates such print paper, which must be held in perfect contact with the negative during the exposure in order to obtain the best results, as is well understood in the art.

The improved platen comprises a rigid back plate 9, preferably of sheet steel, and provided with a marginal flange 10 to give strength and rigidity thereto. A rectangular frame 11 is disposed beneath the plate 9 and movably supported thereby by means of bolts 12 passing through openings 13 therein, with their lower ends screw-threaded into the frame, as at 14, and disposed centrally of sockets 15 formed in the upper side of the frame. The frame 11 is thus supported to have movement to and from the back plate 9, springs 15′ encircling the bolts 12 and disposed between said plate and frame and seated at one end within said sockets, whereby the frame will be yieldingly held spaced from the back plate by said springs and the frame as a whole may yield when excessive pressure is applied by the application of downward pressure upon the back plate, such yielding of the frame as a whole being shown in Fig. 3.

Stretched across the under side of the frame 11, to form a yielding pad 16, with a stuffing therebetween of wool felt 17, are strips of suitable fabric 18, tacked or otherwise suitably secured to the outer edges of the frame. The cushion normally has the shape shown in Fig. 2, with its outer contact face convexed, and which is adapted to yield and flatten out under pressure, as shown in Fig. 3. Disposed between the cushion and the back plate and extending through the opening of the frame 11, are a plurality of closely arranged coil springs 20, the upper ends of which bear against a plate 21, and the lower ends of which engage metal disks 22, having struck-up studs 22′ which the spring ends encircle to prevent relative displacement between the springs and the disks. Depending from the plate 21, to which same is secured by cleats 23, and positioned approximately centrally of the springs 20 when distended, is a fixed board 24, having apertures 25 through which the springs 20 pass, the function of which board is to stay or prevent buckling of the springs when contracted and maintain same in their proper relation.

It will be apparent from the foregoing, and by reference to the drawings, that the platen will conform to the slightest unevenness in either the print paper or the negative, the springs 20 providing a yielding pressure or backing for the pad 16 in a manner permitting the latter to assume a contour conforming with the distinctive area formations of a negative, which are not always of uniform thickness and are frequently warped, thus assuring perfect contact between the print paper and the negative for the printing operation. Furthermore, the frame carrying the contact pad is yieldingly supported, so that same may yield as a whole under excessive pressure, thus materially reducing the danger of breaking uneven or warped glass negatives.

While the foregoing is the preferred form of the invention, it is to be understood that the same is not limited to the precise structure shown and described, as it is obvious that the structure may be variously modified without departing from the spirit of the invention.

What is claimed is:—

1. A platen comprising a back plate, a frame supporting a cushion, yielding means interposed between the back plate and the cushion, and yielding means interposed between the cushion frame and the back plate, whereby the cushion may yield within limits without imparting pressure to its supporting frame.

2. A platen comprising a back plate, a frame carrying a cushion, a plurality of springs interposed between and terminally bearing against the back plate and the cushion, and springs arranged between the cushion frame and the back plate for yieldingly supporting said frame for movement as a whole with relation to the back plate, whereby the cushion may yield within limits without imparting pressure to its supporting frame.

3. A platen comprising a back plate, a frame carrying a cushion, a plurality of springs interposed between the back plate and the cushion, and a member fixed to and spaced from the back plate and the cushion having apertures through which said springs pass.

4. A platen comprising a back plate having apertures, a frame carrying a cushion, a plurality of springs arranged between the back plate and the cushion, an apertured member arranged between the back plate and the cushion through which the springs pass, headed pins carried by the frame and slidably extending through the apertures in the back plate, and coil springs encircling said pins between the back plate and the frame.

In testimony whereof I affix my signature.

HERVEY H. McINTIRE.